United States Patent
Kumar et al.

(10) Patent No.: US 11,133,000 B2
(45) Date of Patent: Sep. 28, 2021

(54) SYSTEMS AND METHODS FOR VOICE CONTROL OF BMS DEVICES

(71) Applicant: Johnson Controls Technology Company, Auburn Hills, MI (US)

(72) Inventors: Sumit Kumar, Madhubani (IN); Pramod Balbhim Kolhapure, Solapur (IN); Sachin Yashwant Pate, Mumbai (IN); Suraj Sunil Lawand, Satara (IN); Ankur Thareja, Alwar (IN); Shyam M. Sunder, Pune (IN)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 258 days.

(21) Appl. No.: 16/158,792

(22) Filed: Oct. 12, 2018

(65) Prior Publication Data
US 2019/0115024 A1 Apr. 18, 2019

Related U.S. Application Data

(60) Provisional application No. 62/571,865, filed on Oct. 13, 2017.

(51) Int. Cl.
*G10L 15/22* (2006.01)
*H04L 29/08* (2006.01)
(Continued)

(52) U.S. Cl.
CPC .............. *G10L 15/22* (2013.01); *G06F 3/167* (2013.01); *G10L 15/26* (2013.01); *H04L 67/125* (2013.01);
(Continued)

(58) Field of Classification Search
CPC ........ G10L 15/00; G10L 15/063; G10L 15/19; G10L 15/22; G10L 17/00; G10L 17/22;
(Continued)

(56) References Cited

U.S. PATENT DOCUMENTS

| 10,529,327 B1* | 1/2020 | Korobov ................ G06F 21/32 |
| 2008/0117922 A1* | 5/2008 | Cockrell ............. H04L 65/1023 370/401 |

(Continued)

OTHER PUBLICATIONS

U.S. Appl. No. 16/028,126, filed Jul. 5, 2018, Johnson Controls Technology Company.

*Primary Examiner* — Huyen X Vo
(74) *Attorney, Agent, or Firm* — Foley & Lardner LLP

(57) ABSTRACT

A portable gateway device for use with a Building Management System (BMS) enables voice command control of BMS devices. The portable gateway device comprises a Wi-Fi module, a serial communications interface, and a data conversion module. The Wi-Fi module is configured to enable communication with a user device via Wi-Fi. The portable gateway device is configured to receive a voice command spoken by a user of the user device. The serial communications interface is configured to enable communication with a bus connected to a BMS device. The data conversion module is configured to translate the voice command received from the user device into a control action associated with the BMS device. The portable gateway device is configured to provide the control action to the BMS device via the serial communications interface. The control action affects a state or condition of the BMS device.

21 Claims, 8 Drawing Sheets

(51) Int. Cl.
*G06F 3/16* (2006.01)
*G10L 15/26* (2006.01)

(52) U.S. Cl.
CPC .. *G10L 2015/221* (2013.01); *G10L 2015/223* (2013.01)

(58) Field of Classification Search
CPC ......... G10L 25/48; G10L 15/08; G10L 15/26; G10L 2015/223; G10L 2015/221; G06F 3/167; G06F 3/16; H04L 67/125; H04L 41/00; H04L 67/025; H04L 29/08
See application file for complete search history.

(56) References Cited

U.S. PATENT DOCUMENTS

| | | | |
|---|---|---|---|
| 2014/0167931 A1* | 6/2014 | Lee | H04L 12/2818 340/12.5 |
| 2015/0288604 A1 | 10/2015 | Boudreaux | |
| 2017/0343971 A1* | 11/2017 | Garcia Martin | H04W 4/023 |
| 2017/0358317 A1* | 12/2017 | James | H04L 63/0861 |
| 2018/0059520 A1* | 3/2018 | Dubois | H03K 17/962 |
| 2018/0076978 A1 | 3/2018 | Schubert et al. | |
| 2018/0102958 A1* | 4/2018 | Guthrie | G06Q 10/20 |
| 2018/0196402 A1* | 7/2018 | Glaser | G05B 15/02 |

* cited by examiner

SYSTEMS AND METHODS FOR VOICE CONTROL OF BMS DEVICES

CROSS-REFERENCE TO RELATED PATENT APPLICATION

This application claims the benefit of and priority to U.S. Provisional Patent Application No. 62/571,865 filed Oct. 13, 2017, the entire disclosure of which is incorporated by reference herein.

BACKGROUND

A building management system (BMS) is, in general, a system of devices configured to control, monitor, and manage equipment in or around a building or building area. A BMS can include a controller, a heating, ventilation, and air conditioning (HVAC) system, a security system, a lighting system, a fire alerting system, and any other system that is capable of managing building functions or devices, or any combination thereof. A BMS may include a variety of devices (e.g., HVAC devices, controllers, chillers, fans, sensors, etc.) configured to facilitate monitoring and controlling the building space. BMS devices can be configured to communicate with other devices via a network. For example, BMS devices can communicate using a Building Automation and Control network (BACnet) Master-Slave Token Passing (MS/TP) protocol. Efficient and user-friendly systems and methods for controlling BMS devices are generally desired.

SUMMARY

One implementation of the present disclosure is a portable gateway device for use with a Building Management System (BMS). The portable gateway device includes a Wi-Fi module configured to enable communication with a user device via Wi-Fi and is configured to receive a voice command spoken by a user of the user device. The portable gateway device further includes a serial communications interface configured to enable communication with a bus connected to a BMS device. The portable gateway device further includes a data conversion module configured to translate the voice command received from the user device into a control action associated with the BMS device. The portable gateway device is further configured to provide the control action to the BMS device via the serial communications interface, thereby affecting a state or condition of the BMS device.

Another implementation of the present disclosure is a system comprising a BMS device, an application installed on a user device, and a portable gateway device The BMS device is connected to a serial communications bus. The application is configured to receive a voice command from a user of the user device via a microphone of the user device and translate the voice command into JSON data. The portable gateway device is configured to receive the JSON data from the user device via a Wi-Fi connection, translate the JSON data into a control action associated with the BMS device, and provide the control action to the BMS device via the serial communications bus, the control action affecting a state or condition of the BMS device.

Yet another implementation of the present disclosure is a method for controlling a Building Management System (BMS) device. The method includes receiving, by a portable gateway device, a voice command from a user device via a Wi-Fi connection, the voice command spoken by a user of the user device. The method further includes translating, by the portable gateway device, the voice command into a control action associated with the BMS device. The method further includes establishing, by the portable gateway device, a connection to the BMS device via a serial communications bus. The method further includes providing, by the portable gateway device, the control action to the BMS device via the serial communications bus, the control action affecting a state or condition of the BMS device.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Referring generally to the FIGURES, systems and methods for voice control of BMS devices are shown, according to various embodiments. In some embodiments, a BMS includes a portable gateway configured to interface with a number of BMS devices. The portable gateway can be configured to perform read and write operations and interface with building systems and devices in response to a voice command control input. The voice command control input can be received from an input device communicably coupled to the portable gateway. The input device may be a mobile device (e.g., a smartphone) or a standalone device. In some embodiments, the input device generally includes a microphone for receiving an audio input and a speaker for providing an audio output. The gateway and/or the input device may have one or more processing circuits that include a number of modules stored in a memory. The modules are configured to enable voice command control of the gateway without requiring the use of external systems, servers, or an Internet connection.

Building Management System and HVAC System

Figure 1:
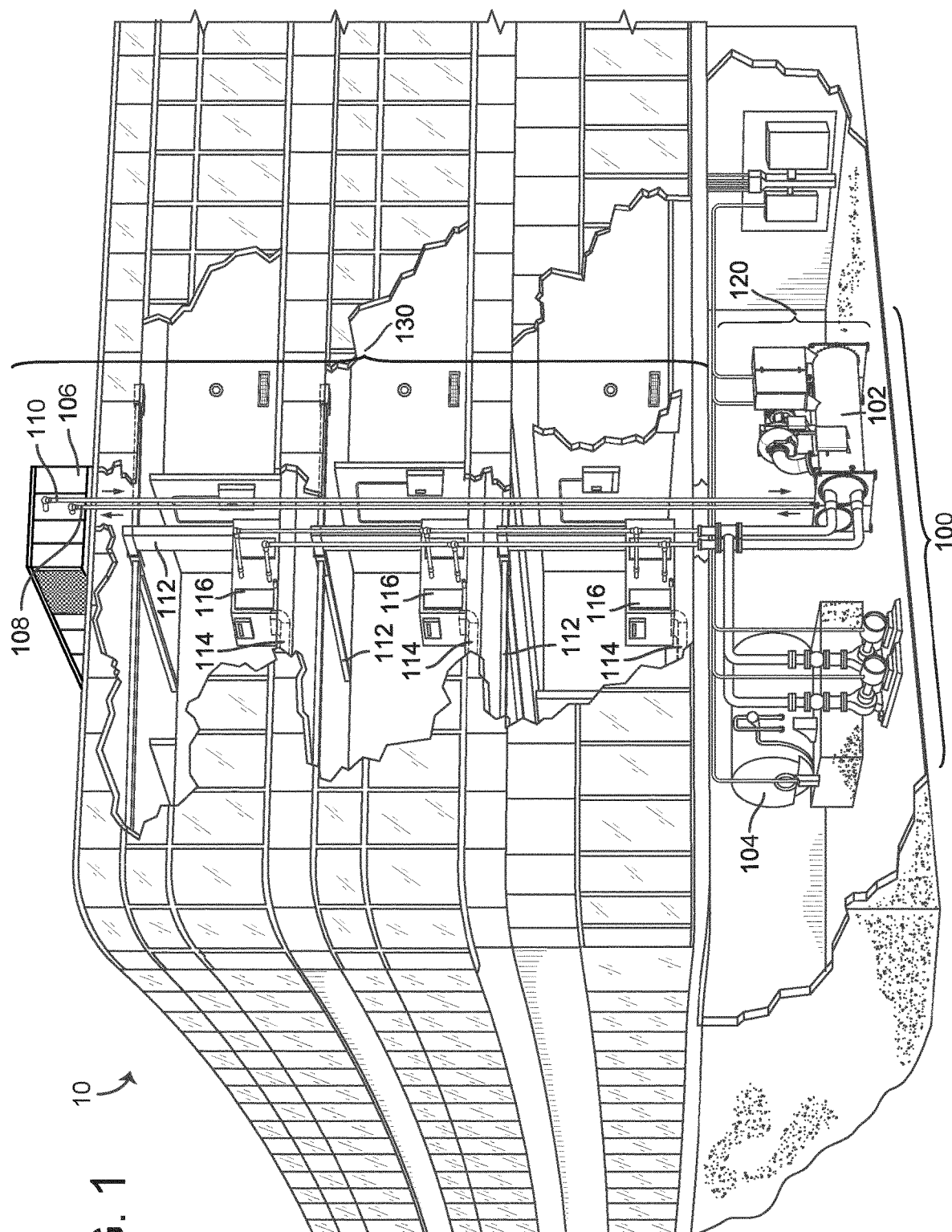
FIG. 1 is a drawing of a building equipped with a HVAC system, according to some embodiments.

Referring now to FIGS. 1-4, an exemplary building management system (BMS) and HVAC system in which the systems and methods of the present invention may be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, an HVAC system, a security system, a lighting system, a fire alerting system, or any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
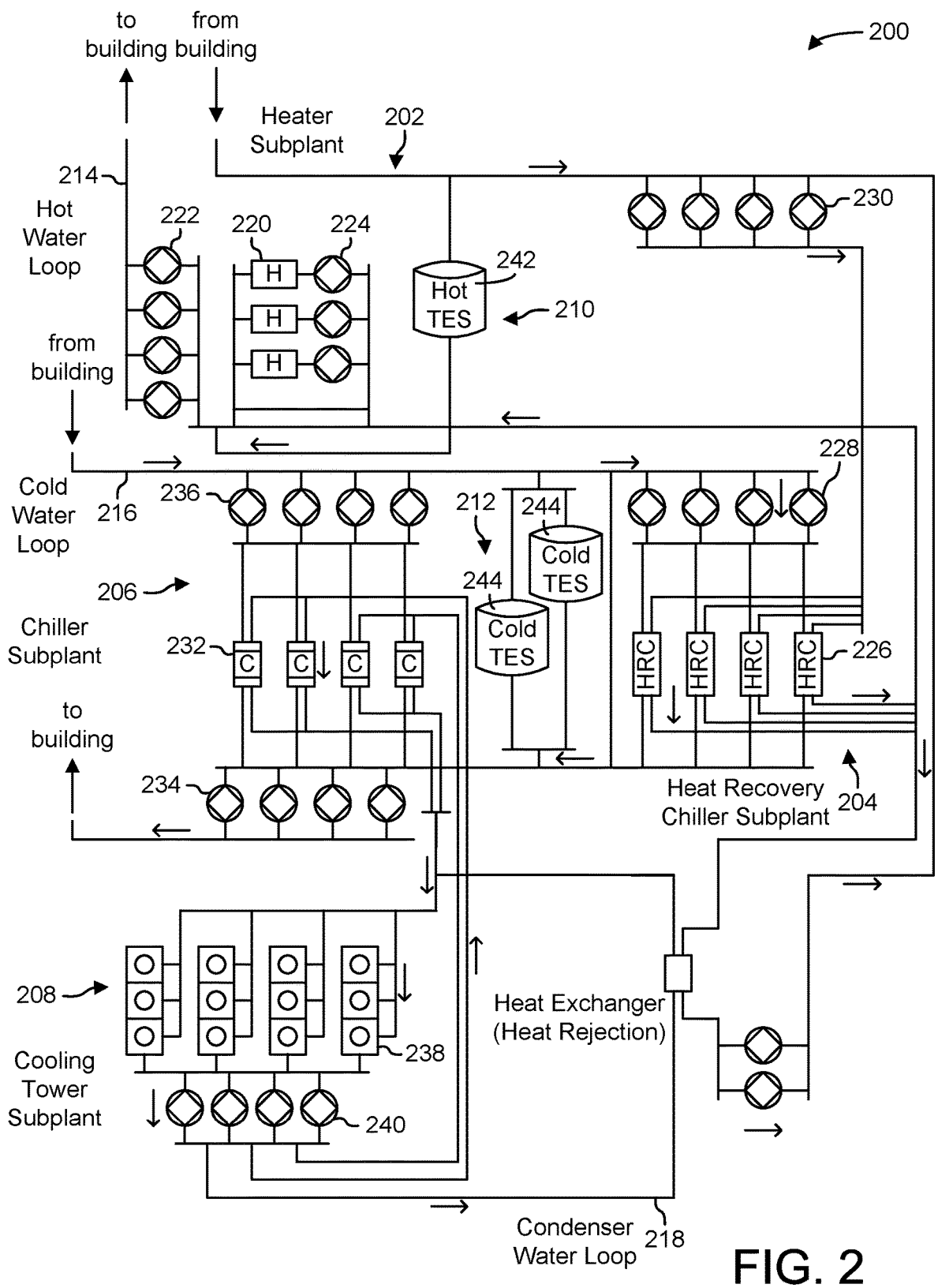
FIG. 2 is a block diagram of a waterside system that may be used in conjunction with the building of FIG. 1, according to some embodiments.

Referring now to FIG. 2, a block diagram of a waterside system 200 is shown, according to one embodiment. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between the chiller subplant 206 and the building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
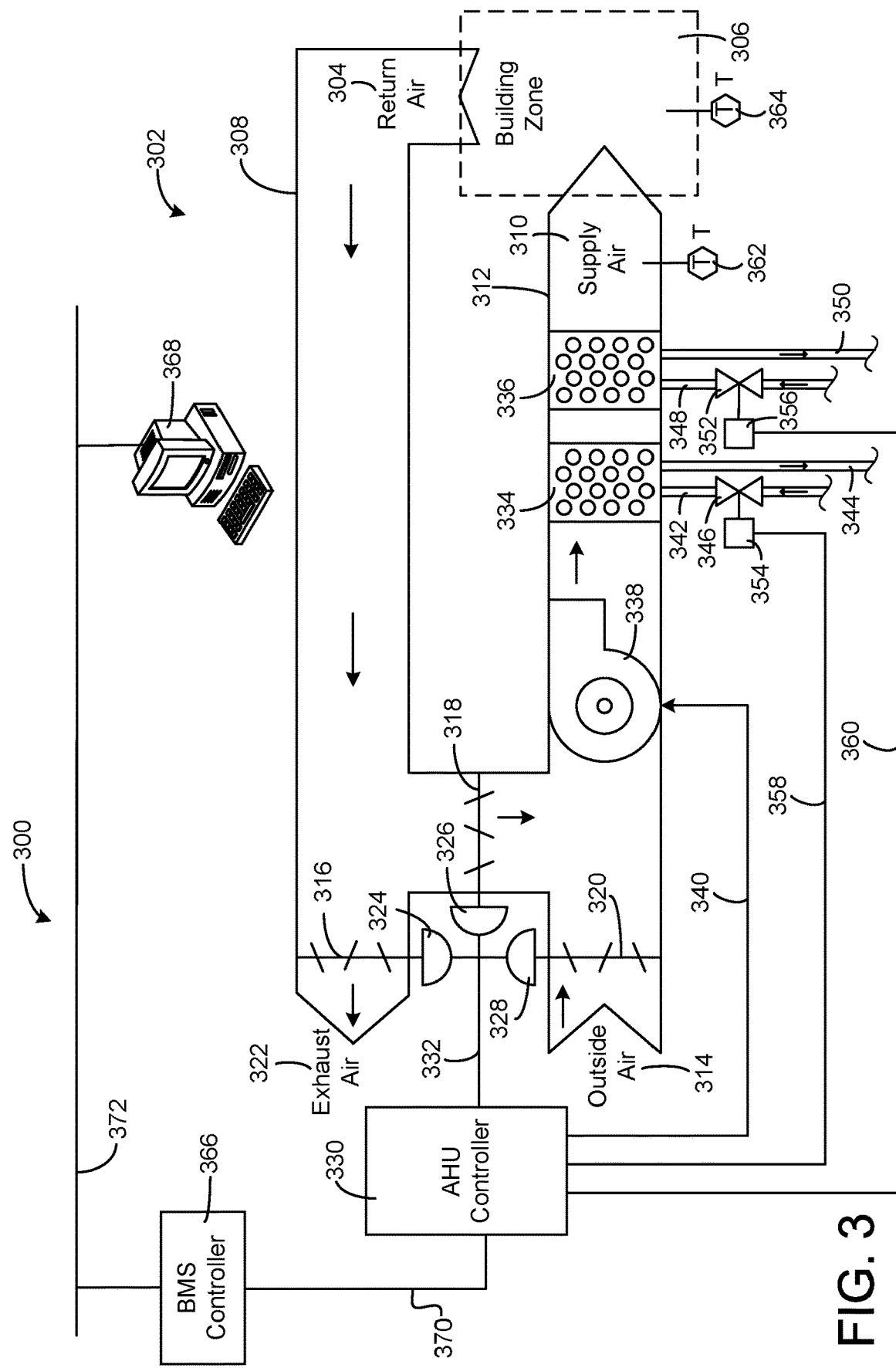
FIG. 3 is a block diagram of an airside system that may be used in conjunction with the building of FIG. 1, according to some embodiments.

Referring now to FIG. 3, a block diagram of an airside system 300 is shown, according to an exemplary embodiment. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
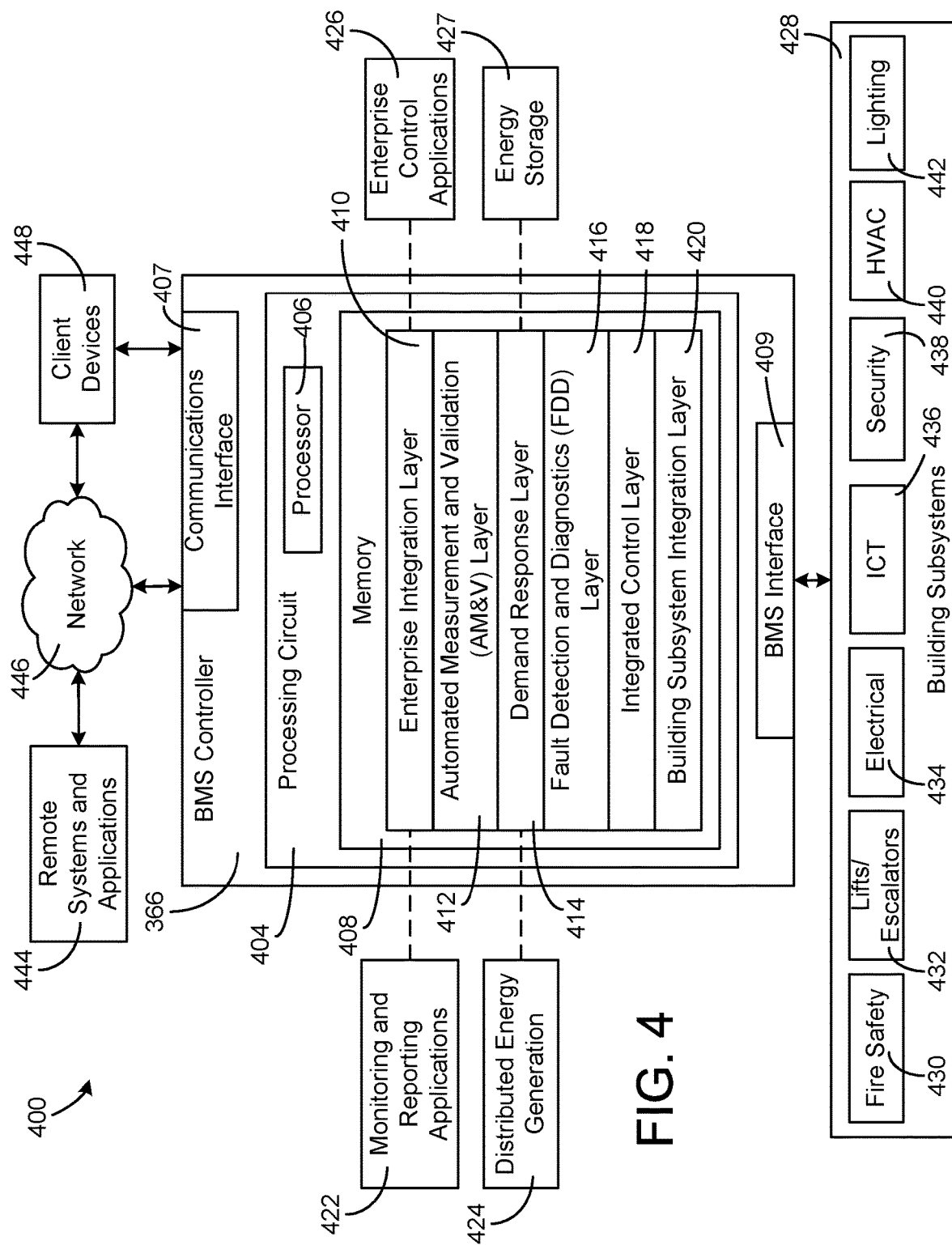
FIG. 4 is a block diagram of a building management system (BMS) that may be used to monitor and control the building of FIG. 1, according to some embodiments.

Referring now to FIG. 4, a block diagram of a building management system (BMS) 400 is shown, according to an exemplary embodiment. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 may be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, flash memory, hard disk storage, etc.) for storing data and/or computer code for completing or facilitating the various processes, layers and modules described in the present application. Memory 408 may be or include volatile memory or non-volatile memory. Memory 408 may include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 may be distributed across multiple servers or computers (e.g., that can exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration layer 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions can specify which equipment may be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response layer 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 may be configured to provide calculated inputs (e.g., aggregations) to these higher levels based on outputs from more than one building subsystem.

Automated measurement and validation (AM&V) layer 412 may be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) may shut-down systems or direct control activities around faulty devices or systems to reduce energy waste, extend equipment life, or assure proper control response.

FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Voice Control of BMS Devices

Figure 5:
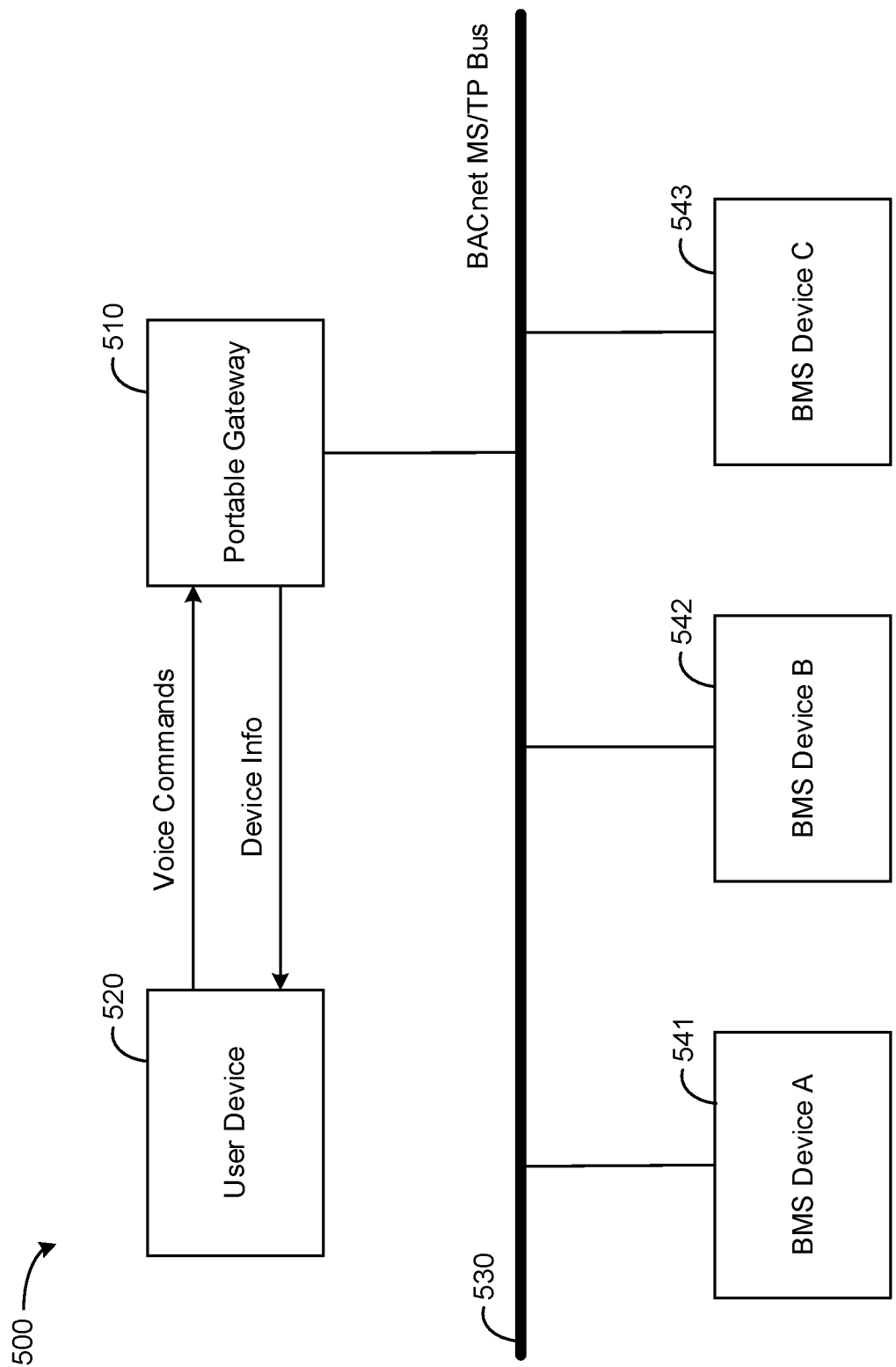
FIG. 5 is a block diagram of an example system voice control of BMS devices, according to some embodiments.

Referring now to FIG. 5, a block diagram of an example system 500 for voice control of BMS devices is shown, according to some embodiments. System 500 is shown to include a portable gateway 510, a user device 520, a Building Automation and Control network (BACnet) Master-Slave Token Passing (MS/TP) communications bus 530, and a plurality of BMS devices. Portable gateway 510 can be a device that enables connections to bus 530 via Wi-Fi. Portable gateway 510 can be a handheld device that can be easily transported and can provide a user interface to user device 520 for monitoring and editing data associated with BMS 400. In some embodiments, portable gateway 510 is a Mobile Access Portal (MAP) Gateway as sold by Johnson Controls. User device 520 may be a mobile device (iPhone, Android phone, windows phone, linux-based phone, etc.), a tablet device (iPad, Android table, Surface/SurfacePro, etc), a laptop (Windows, OSX, Linux, etc), or other portable computing device (e.g., a standalone device). BMS devices 541, 542, and 543 can be any of the BMS devices described above (e.g., controllers, thermostats, chillers, fans, AHUs, rooftop units, VAVs, temperature sensors, valves, lights, fire alarms, etc.) in addition to any other types of BMS devices connected to bus 530. User device 520 can generally be configured to receive voice inputs from a user and transmit those inputs to gateway 510. Gateway 510 can then provide appropriate communications to BMS devices 541, 542, and 543 and provide information about these devices back to user device 520.

Figure 6:
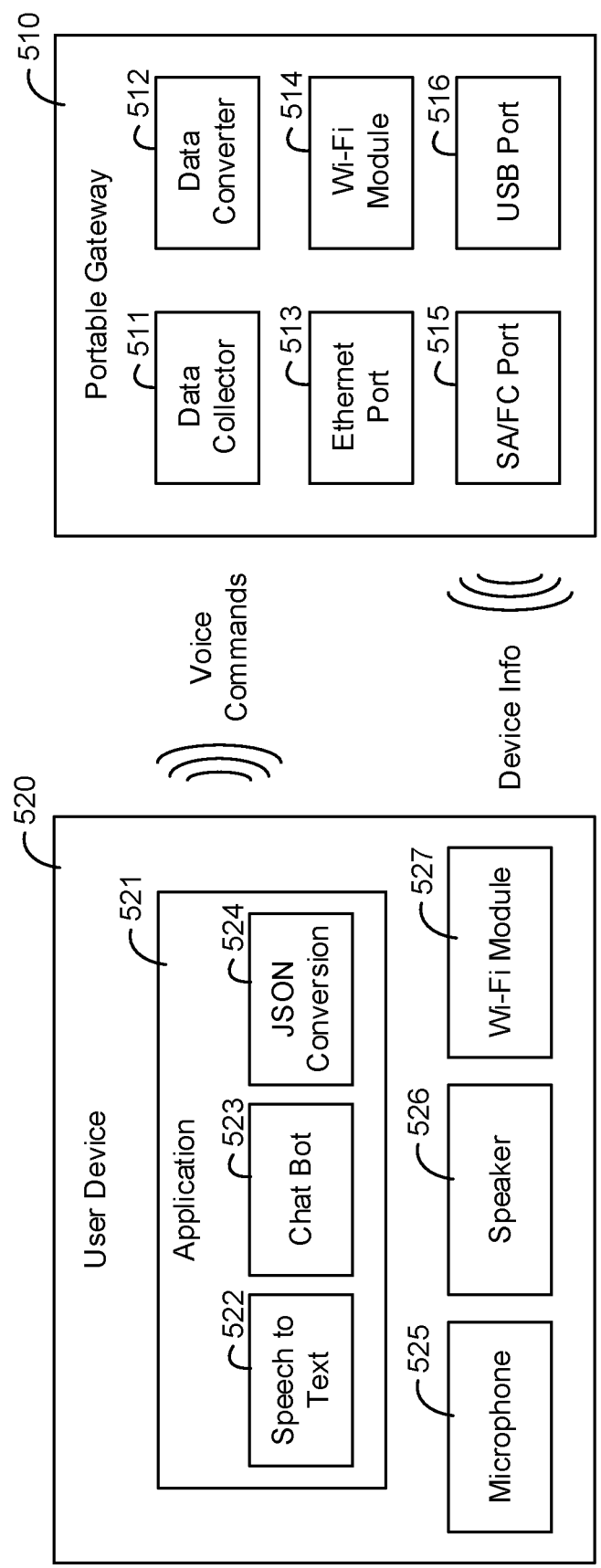
FIG. 6 is a block diagram of a user device and a portable gateway associated with the network of FIG. 5, according to some embodiments.

Referring now to FIG. 6, a block diagram showing gateway 510 and user device 520 in more detail is shown, according to some embodiments. User device 520 is shown to include an application 521 (e.g., iOS application, Android application, etc.) that is generally configured to receive a voice input from a user and translate the voice input into JSON data. The voice input, for example, can relate to a request to read parameter values associated with BMS devices or a request to write values to parameters associated with BMS devices on the network. User device 520 is shown to include a microphone 525 configured to receive audio input from a user and a speaker 526 configured to provide audio output to the user. User device 520 is also shown to include a Wi-Fi module 527 that enables user device 520 to communicate with gateway 510 via Wi-Fi.

Application 521 is shown to include a speech to text module 522, a chat bot module 523, and a JSON conversion module 524. Speech to text module 522 can be configured to convert the input speech data form the user into text (e.g., a string or string array). In some embodiments, module 522 uses a third-party API (e.g. IBM Watson, Microsoft Azure, Google Cloud, etc.). The text format can then be analyzed by modules 523 and 524. Chat bot module 523 can be configured to provide a response to the user based on the speech input. For example, if the speech input is "please set my thermostat to 71 degrees," chat bot module 523 can provide a text response to the user via application 521 that says "sure thing I will do that right away." In some embodiments, chat bot module 523 can also provide an audio response to the user that can be transmitted through speaker 526. Chat bot module 523 can be an artificial intelligence markup language (AIML) based chat bot and can use natural language processing (NLP) to hold a human-like conversation with end-users. JSON conversion module 524 can be configured to analyze the speech input in order to determine appropriate JSON data to be sent to portable gateway 510. JSON conversion module 524 can be configured to analyze a string or string array, extract key information from the string or string array, and populate a JSON data object or data array using the key information. For example, for the string "please set my thermostat to 71 degrees," JSON conversion module can be configured to populate a thermostat data object with a setpoint of 71 degrees.

Portable gateway 510 is shown to include a data collector 511, a data converter 512, an Ethernet port 513, a Wi-Fi module 514, a serial communications port 515, and a USB port 516. Data collector 511 can be configured to receive data (e.g., JSON data) from user device 520. USB port 516 can enable connection to a Node.js server application in order to retrieve web content. USB port 516 can also enable connection to a power supply and other types of external systems and devices. In some embodiments, portable gateway 510 is configured to provide a web interface (e.g., via a web browser) to a user via user device 520. Data collector 511 can receive data from web applications (e.g., client-side scripting and server-side scripting) as well as application 521 installed on user device 520.

Serial communications port 515 can be configured to enable a connection between portable gateway 510 and a BMS communications bus such as MS/TP bus 530. Bus 530 can include both a field controller (FC) bus and a sensor actuator (SA) bus as defined by the BACnet protocol, for example. Bus 530 can also be extended remotely over an IP network with a BACnet IP to MS/TP router, for example. As such, portable gateway 510 can directly (e.g., wired) connect to bus 530 through serial communications interface 515 or can connect to bus 530 indirectly through a connection between Ethernet port 513 and a BACnet IP to MS/TP router. The MS/TP protocol generally involves the passing of tokens between supervisory devices (e.g., master devices). Messages may be sent to field devices (e.g., slave devices) if the associated supervisory device possess an appropriate token, for example. Data converter 512 can be configured to translate data received by data collector 511 into appropriate messages and tokens to be communicated to BMS devices via bus 530. For example, if data collector 511 receives JSON data that indicates a temperature setpoint change should be made for a thermostat, data converter 512 can generate an appropriate message containing the new temperature setpoint to be transmitted to the thermostat via bus 530. Data converter 512 can also be configured to translate data received from bus 530 into data that can be transmitted back to user device 520 via Wi-Fi module 514.

Figure 7:
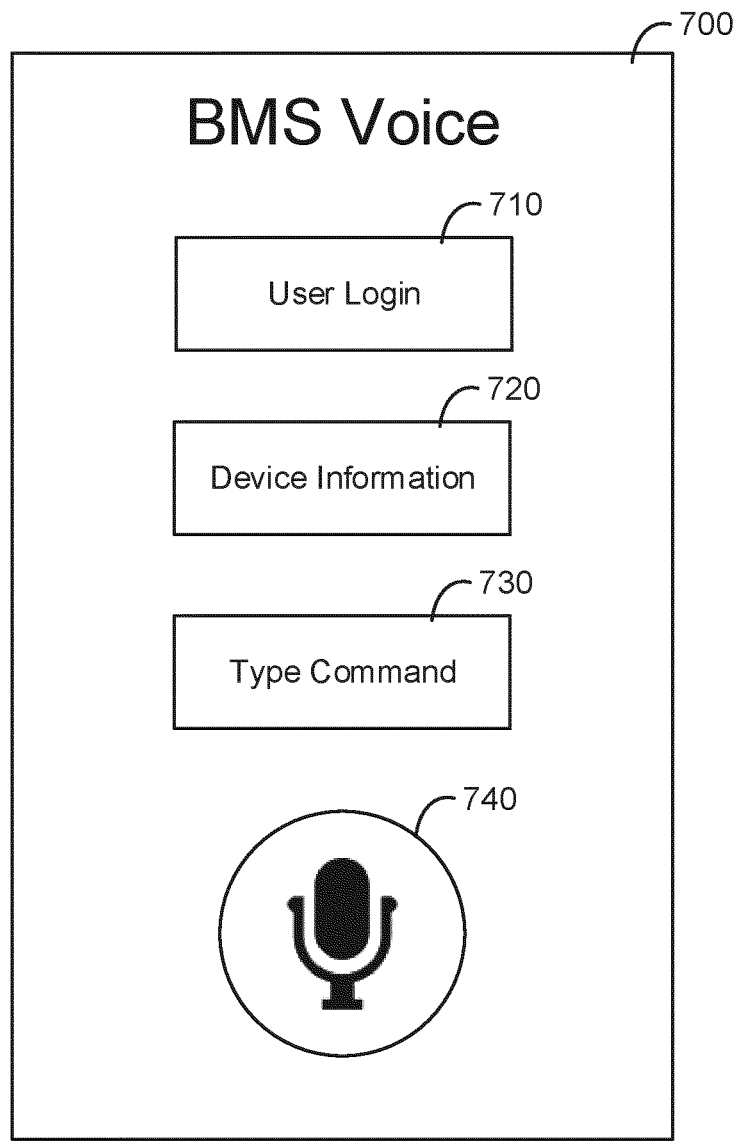
FIG. 7 is a block diagram of a user interface associated with the user device of FIG. 6, according to some embodiments.

Referring now to FIG. 7, an example user interface 700 associated with user device 520 is shown, according to some embodiments. Interface 700 can be generated and presented by application 521, for example. Interface 700 is shown to include a user login 710. User login 710 can be implemented in a variety of ways including using biometrics (e.g., fingerprint, facial recognition), a passcode, and a user name and password combination. In some embodiments, the user login is associated with an account associated with BMS 400 to facilitate automation of audit logging and other features. Interface 700 is also shown to include device information 720 that can include any information received by user device 520 form portable gateway 510. For example, device information can include data points and other parameters and settings associated with any BMS devices connected to bus 530. Interface 700 is also shown to include type command functionality 730 and voice command functionality 740.

Figure 8:
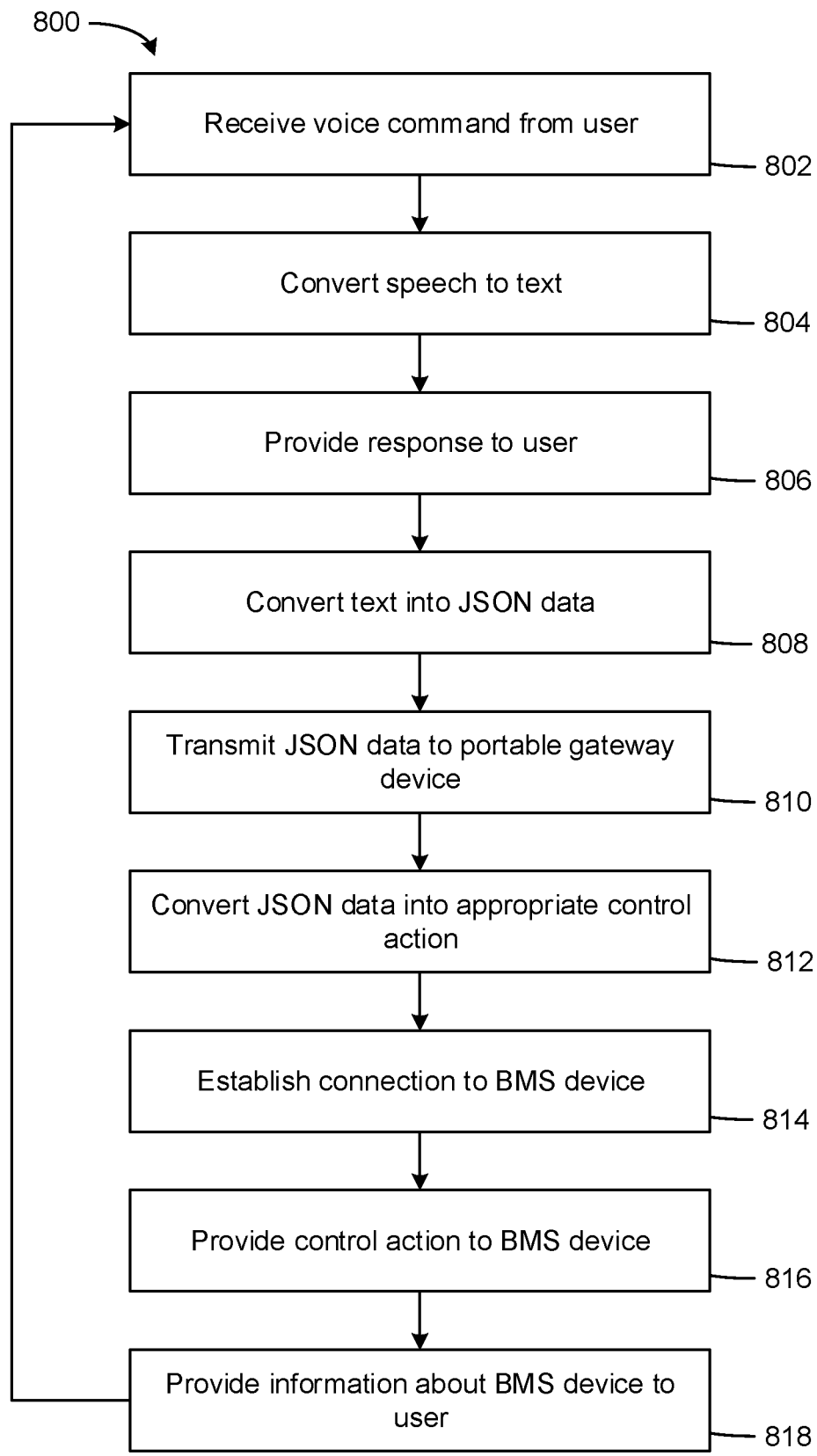
FIG. 8 is a flow diagram of a process for controlling a BMS device through voice commands, according to some embodiments.

Referring now to FIG. 8, an example process 800 for controlling a BMS device through voice commands is shown, according to some embodiments. Process 800 can be performed by system 500, for example. Process 800 provides an effective and efficient method for control of BMS devices using voice control functionality. For example, portable gateway 510 can be a simple handheld device that can be carried by technicians or other personnel between different building facilities. Portable gateway 510 can easily connect to a building network such as bus 530 and can also conveniently connect to user device 520. The voice control functionality enabled by portable gateway 510 and application 521, for example, allows technicians and other personnel (e.g., building stakeholders, etc.) to control BMS devices with minimal effort. For example, a technician can request information associated with BMS devices and change parameters associated with BMS devices by simply speaking to a smartphone, tablet, or other user device.

Process 800 is shown to include receiving a voice command from a user (step 802). For example, a user can speak a voice command such as "set my thermostat to 71 degrees" and this voice command can be received by user device 520 and provided to application 521. Process 800 is also shown to include converting speech to text (step 804). For example, speech to text module 522 of application 521 can convert the voice command into a string or string array. Process 800 is also shown to include providing a response to the user (step 806). For example, chat bot module 523 can provide a text or audio response to the user via user device 520 based on the voice command. Process 800 is also shown to include converting the text into JSON data (step 808). For example, JSON conversion module 524 can extract key information from the voice command and translate it into an appropriate JSON data object.

Process 800 is also shown to include transmitting the JSON data to a portable gateway device (step 810). For example, user device 520 can transmit the JSON data to portable gateway 510 via Wi-Fi. Process 800 is also shown to include converting the JSON data into an appropriate control action (step 812). For example, data converter 512 can convert the JSON data into an appropriate message to be sent to a BMS device via bus 530. Process 800 is also shown to include establishing a connection to the BMS device (step 814). For example, this connection can be established through Ethernet port 513 or serial port 515 as described above. Process 800 is also shown to include providing the control action to the BMS device (step 816) and providing information about the BMS device to the user (step 818).

In some embodiments, portable gateway 510 generally includes a processing circuit with a processor and a memory. The processor can be configured to execute computer code or instructions stored in memory or received from other computer readable media (e.g., CDROM, network storage, a remote server, etc.). The memory may include one or more devices (e.g., memory units, memory devices, storage devices, etc.) for storing data and/or computer code for completing and/or facilitating the various processes described in the present disclosure. The memory may include random access memory (RAM), read-only memory (ROM), hard drive storage, temporary storage, non-volatile memory, flash memory, optical memory, or any other suitable memory for storing software objects and/or computer instructions. The memory may include database components, object code components, script components, or any other type of information structure for supporting the various activities and information structures described in the present disclosure. The memory may be communicably connected to the processor via the processing circuit and may include computer code for executing (e.g., by the processor) one or more processes described herein. When the processor executes instructions stored in the memory, the processor generally configures portable gateway 510 (and more particularly the processing circuit) to complete such activities.

The systems and methods for voice command control of a MAP gateway described herein allow a user to more efficiently and conveniently perform read and write operations without the need of using traditional user interfaces (e.g., a webpage interface, buttons, switches). For example, by removing the requirement to navigate through and use existing interfaces, a user can interact with gateway 510, even with the user's hands full or while doing other tasks. The system does not require communication with the Internet or cloud-based servers, increasing data security and speed. The integrated system requires less maintenance and can work with existing infrastructure.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A portable gateway device for use with a Building Management System (BMS), the portable gateway device comprising:
   a Wi-Fi module configured to enable communication with a user device via Wi-Fi, the portable gateway device configured to receive a voice command spoken by a user of the user device, wherein the user device translates the voice command into JSON data and provides the JSON data to the Wi-Fi module;
   a serial communications interface configured to enable communication with a bus, the bus connected to a BMS device; and
   a data conversion module configured to translate the JSON data received from the user device into a control action associated with the BMS device;
   wherein the portable gateway device is configured to provide the control action to the BMS device via the serial communications interface, the control action affecting a state or condition of the BMS device.

2. The portable gateway device of claim 1, wherein the BMS device is a sensor, a controller, an actuator, a chiller, a boiler, a pump, a fan, an air handling unit (AHU), a variable air volume unit (VAV), a damper, or an alarm.

3. The portable gateway device of claim 1, wherein the bus is a Building Automation and Control network (BACnet) Master-Slave Token-Passing (MS/TP) bus.

4. The portable gateway device of claim 1, wherein the control action is a temperature setpoint, a speed setpoint, a pressure setpoint, a mode, an on/off command, or a time period.

5. The portable gateway device of claim 1, further configured to receive the voice command from the user device in JSON format.

6. The portable gateway device of claim 1, further comprising an Ethernet port configured to enable connection to a remote bus, the remote bus connected to one or more additional BMS devices.

7. The portable gateway device of claim 1, wherein:
   the BMS device is a data object; and
   the control action comprises adjusting one or more properties of the data object.

8. A system comprising:
   a BMS device connected to a serial communications bus;
   an application installed on a user device, the application configured to:
      receive a voice command from a user of the user device via a microphone of the user device; and
      translate the voice command into JSON data; and
   a portable gateway device configured to:
      receive the JSON data from the user device via a Wi-Fi connection;
      translate the JSON data into a control action associated with the BMS device; and
      provide the control action to the BMS device via the serial communications bus, the control action affecting a state or condition of the BMS device.

9. The system of claim 8, wherein the BMS device is a sensor, a controller, an actuator, a chiller, a boiler, a pump, a fan, an air handling unit (AHU), a variable air volume unit (VAV), a damper, or an alarm.

10. The system of claim 8, wherein the serial communications bus is a Building Automation and Control network (BACnet) Master-Slave Token-Passing (MS/TP) bus.

11. The system of claim 8, wherein the control action is a temperature setpoint, a speed setpoint, a pressure setpoint, a mode, an on/off command, or a time period.

12. The system of claim 8, wherein the application is further configured to provide a response to the user based on the voice command.

13. The system of claim 8, wherein the application is further configured to initiate a biometric login process when the user access the application.

14. The system of claim 8, wherein the application is further configured to convert the voice command into a text string.

15. The system of claim 8, wherein the JSON data includes an object or an array.

16. A method for controlling a Building Management System (BMS) device, the method comprising:
   receiving, by a portable gateway device, JSON data from a user device via a Wi-Fi connection, the user device configured to translate a voice command from the user device into the JSON data;
   translating, by the portable gateway device, the voice command as JSON data into a control action associated with the BMS device;
   establishing, by the portable gateway device, a connection to the BMS device via a serial communications bus; and
   providing, by the portable gateway device, the control action to the BMS device via the serial communications bus, the control action affecting a state or condition of the BMS device.

17. The method of claim 16, wherein the BMS device is a sensor, a controller, an actuator, a chiller, a boiler, a pump, a fan, an air handling unit (AHU), a variable air volume unit (VAV), a damper, or an alarm.

18. The method of claim 16, wherein the control action is a temperature setpoint, a speed setpoint, a pressure setpoint, a mode, an on/off command, or a time period.

19. The method of claim 16, wherein receiving the voice command from the user device comprises receiving a JSON data object or a JSON data array.

20. The method of claim 16, wherein establishing a connection to the BMS device via the serial communications bus comprises:
   connecting to the serial communications bus directly via a serial interface of the portable gateway device; or
   connecting to the serial communications bus remotely via an Ethernet interface of the portable gateway device.

21. The method of claim 16, further comprising providing information about the BMS device to the user by transmitting the information about the BMS device from the portable gateway device to the user device.

* * * * *